Patented Dec. 6, 1938

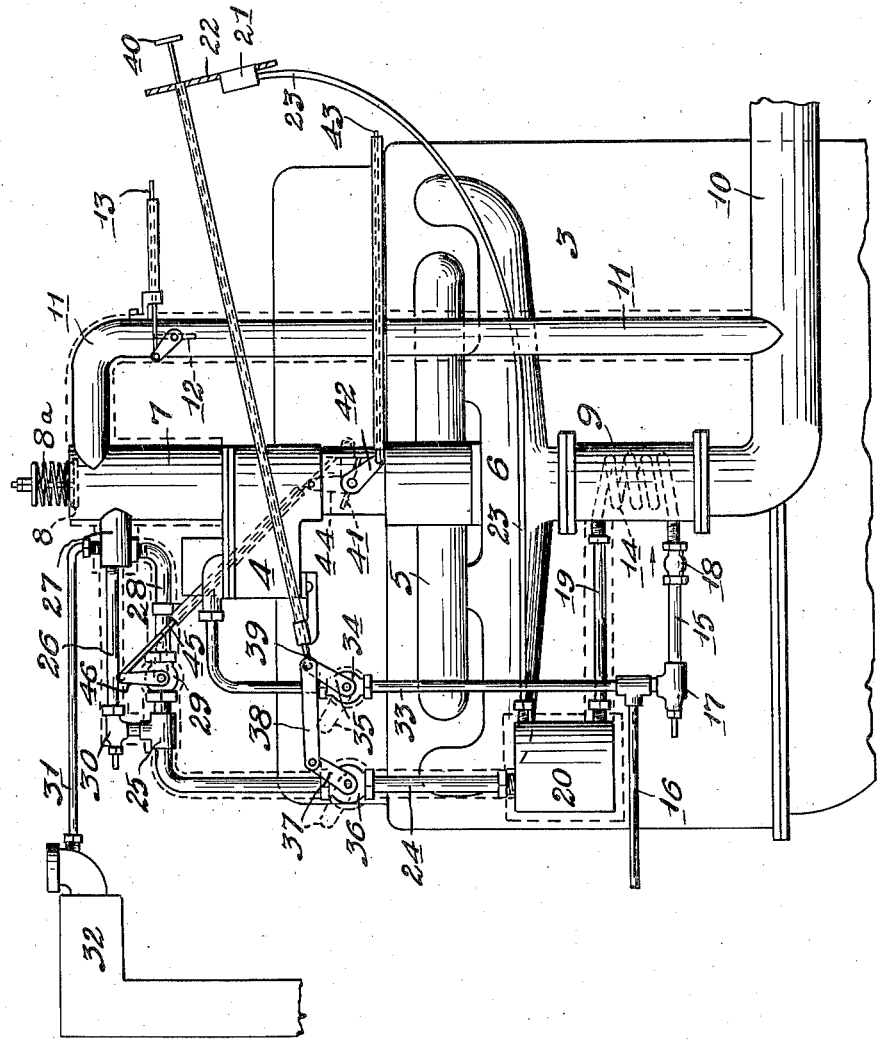

2,139,371

UNITED STATES PATENT OFFICE 2,139,371

FUEL SUPPLY SYSTEM FOR INTERNAL COMBUSTION ENGINES

Willard Ledger and Roy Borden, Spalding, Mich., assignors of one-third to Ole Harstad, Bark River, Mich.

Application May 10, 1937, Serial No. 141,676

5 Claims. (Cl. 123—127)

It is our object to provide a fuel supply system for internal combustion engines whereby greatly improved economy in the use of fuel is secured.

A further object is to improve the economy and efficiency of a fuel supply system for an internal combustion engine by supplying hot gaseous fuel and air to the engine at pressures which are substantially affected by the pressures and temperatures of the exhaust gases from the engine.

A particular object is to provide a fuel supply system utilizing one or more liquid fuels and employing the usual or suitable carburetor for starting purposes and a separate and independent fuel supply system during the subsequent operation, the latter system heating the fuel to gaseous form and mixing it with heated air and gases in such proportions and so regulated automatically that a highly efficient combustible mixture is supplied to the engine through an unusually wide range of operating speeds and loads.

Other objects will appear and be more fully pointed out in the following specification and claims.

The accompanying drawing is a side view of our improved fuel supply system on an internal combustion engine of common type.

In the accompanying drawing the numeral 3 indicates an internal combustion engine of the common multiple cylinder type having a carburetor indicated generally by the numeral 4, an intake manifold 5 connecting the cylinder to the carburetor 4 and an exhaust manifold 6 communicating with the engine cylinders in a manner well known in this art. Air is supplied to the carburetor 4 and manifold 5 through an intake pipe 7 having an air supply valve 8. This valve has a spring 8a to close it, the compression of the spring being adjustable so that the valve is opened varying amounts which are proportional to the differences in the internal and external pressures. A fuel heater 9 is arranged to receive the hot gases from the manifold 6 and to discharge them through an exhaust pipe 10.

A branch 11 of the exhaust pipe 10 is arranged to conduct a portion of the exhaust gases into the upper end of the intake pipe 7 and in so functioning to modify the fuel feed pressures by the exhaust gas pressures. The flow of gases and pressures in the upper part of the branch 11 are controlled by a throttle 12 which is operable preferably by a Bowden wire indicated by the numeral 13.

The heater 9 contains a coil 14 of tubing which is subjected to the heat of the exhaust gases and is supplied with liquid fuel at its lower end by a pipe 15. This pipe is, in turn, supplied through a pipe 16 extending to a fuel pump or other fuel supply of suitable or well known type. A needle valve 17 is provided to regulate the flow of fuel through the pipe 15 and a check valve 18 is also provided in the pipe 15 to allow flow to the heater coil but prevent the gaseous fuel under increased pressure therein from being forced back through the pipes 15 and 16. An outlet pipe 19 for gaseous fuel connects the upper end of the coil 14 to a reservoir 20. The pressures within the reservoir are indicated by a gauge 21 mounted on an instrument panel 22 for the engine and connected to the reservoir by a small pipe 23. From the top of the reservoir 20, a pipe 24 conducts the gaseous fuel to a fitting 25 where the pipe branches and has a smaller branch 26 communicating with the pipe 7 through a fitting 27 and a branch 28 communicating with the latter fitting under control of a valve 29. The pipe 26 supplies sufficient gas for the engine when the latter is idling and a needle valve 30 in this pipe affords an idling adjustment of the fuel supply. Water vapor is also delivered to the fitting 27 through a pipe 31 communicating with the top of a tank or radiator 32. Common types of vehicle engines have radiators which are water cooled and the numeral 32 indicates diagrammatically the upper portion of the radiator of such vehicle engine.

A branch 33 of the fuel supply pipe 16 extends to the carburetor 4 under control of a valve 34. This valve has an operating arm 35 and another valve 36 controls the flow of fuel through the pipe 24 and has an operating arm 37 connected to the arm 35 by a link 38 so that these valves may be operated in unison. When the arms 35 and 37 are in the full line position shown in the drawing the valve 34 is open and the valve 36 is closed, as for starting the engine when the latter is cold. Movement of the arms 35 and 37 to their dotted line positions closes the valve 34 and opens the valve 36 for operation with the engine warm. These valves may be actuated by a Bowden wire 39 extending to an operating head 40 on the instrument board 22. Otherwise, the valves 34 and 36 may be actuated automatically by a suitable or well known type of pressure operated control under the influence of the gas pressure in the reservoir 20 or by a thermostatic control associated with the exhaust manifold 6 or pipe 10.

A throttle 41, located in the pipe connecting the carburetor with the manifold 5, is operable by an arm 42 and wire 43 extending to the manual or foot operated controls for the engine. Fixed on the pivot 41a for throttle 41 is a second arm 44 arranged to operate a wire 45 extending to an arm 46 for actuating the valve 29. Through these connections the valve 29 is caused to open in proportion to the opening of the throttle 41 so that a definite relationship is established between the volume of gas supplied through the pipe 28 and the volume of mixed gas and air supplied to the intake manifold 5.

To conserve heat and maintain the fuel in gaseous form, the reservoir 20 and pipes 7, 11, 19, 24, 26 and 28 are enclosed in heat insulating jackets indicated by dotted lines in the drawing. The pipe 11 is so proportioned relative to the exhaust pipe 10 that the pressure created in the latter is transmitted at somewhat reduced degree to the stream of gases flowing to the intake manifold but the branch is not sufficiently large to transmit flame or burning particles to the combustible mixture of gases. We have found that where the exhaust pipe 10 is about two inches in inside diameter, the pipe 11 should be about one inch in inside diameter.

In operation, to start the engine the head 40 of the control wire 39 is drawn out to the position indicated in the drawing. This opens the valve 34 and closes the valve 36. The control wire 13 may also be actuated to "choke" the throttle 12 and thereby partially close the pipe 11. The engine is now started in the usual manner, the gasoline or other liquid fuel being supplied through the pipes 16 and 33 to the carburetor 4. After a short period of operation, the heater 9 gasifies fuel supplied through the pipe 15 to the coil 14 and fills the reservoir 20 with the gas under pressure. This pressure is indicated on the gauge 21 and when a substantial pressure is indicated the head 40 is actuated to close the valve 34 and open the valve 36. It will be understood that the throttle 12 is moved to open position for normal operation with a warm engine. Now the engine is supplied with gaseous fuel through the pipes 24 and 26, air being supplied through the valve 8. A proper mixture is obtained by adjustments of the valve 30 for idling and of the valve 17 for operation under load. The fuel is maintained in gaseous form until it reaches the combustion chambers by the insulation on the conduits and by the additional heat supplied through the pipe 11. This pipe also maintains the pressure at a desirable point in the fuel supply pipe 7. As the throttle 41 is opened the valve 29 is opened proportionately through its connection with the throttle 41 hereinbefore described so that with proper adjustments of the needle valves 17 and 30 the engine cannot consume more than the minimum requirements of fuel for the power required at any time throughout the operating range of speeds and loads.

Our system has proved to be highly efficient as applied to automobile engines which, as is well known, are operated through a wide range of motor speeds using gasoline both as the fuel for starting and for continued operation. Great economy in the use of fuel has been secured throughout the range of automobile speeds. The theory or reason for this great economy is not fully understood but it is believed to be caused by our accurate, automatic controls which limit the use of a gaseous fuel to the exact requirements for efficient operation at all speeds and loads and by our alteration of the fuel feed pressures and maintenance of elevated temperatures in the fuel supply pipe.

A number of modifications will be obvious to those skilled in this art. Low grade liquid fuels may be used as well as gasoline in our improved system and the illustrated manual controls, such as the choke wire 13, valve operating wire 39, may be operated automatically by either pressure controlled or thermostatically controlled mechanisms well known in this art.

Having described our invention, what we claim as new and desire to protect by Letters Patent is:

1. The combination with an internal combustion engine having exhaust and intake conduits and a carburetor communicating with said intake conduit, of an auxiliary fuel supply system comprising, a coil associated with said exhaust conduit for heating a fuel supply to gaseous form, means for supplying fuel to said coil, a reservoir for gaseous fuel communicating with said coil, an outlet pipe for said reservoir communicating with said intake conduit and means for supplying air and heated gases to said intake conduit.

2. The combination with an internal combustion engine having exhaust and intake conduits and a carburetor communicating with said intake conduit, of an auxiliary fuel supply system comprising, a coil associated with said exhaust conduit for heating the fuel supply to gaseous form, means for supplying liquid fuel to said coil, a pipe for supplying gaseous fuel from said coil to said intake conduit, a second pipe for supplying fuel to said carburetor and interconnected valves in said pipes respectively for shutting off the supply of fuel to said carburetor when fuel is supplied to said intake conduit through said first mentioned pipe.

3. The combination with an internal combustion engine having exhaust and intake conduits and a carburetor communicating with said intake conduit, of an auxiliary fuel supply system comprising, a coil associated with said exhaust conduit for heating the fuel supply to gaseous form, means for supplying liquid fuel to said coil, a pipe for supplying gaseous fuel from said coil to said intake conduit, a second pipe for supplying fuel to said carburetor, interconnected valves in said pipes respectively for shutting off the supply of fuel to said carburetor when fuel is supplied to said intake conduit through said first mentioned pipe and means independent of said carburetor for regulating the supply of gaseous fuel from said coil.

4. The combination with an internal combustion engine having exhaust and intake conduits and a carburetor communicating with said intake conduit, of an auxiliary fuel supply system comprising, a coil associated with said exhaust conduit for heating the fuel supply to gaseous form, means for supplying liquid fuel to said coil, a reservoir for gaseous fuel communicating with said coil, an outlet pipe for said reservoir communicating with said intake conduit, a second pipe for supplying fuel to said carburetor, means for supplying hot gases to said intake conduit and interconnected valves in said pipes respectively for shutting off the supply of fuel to said carburetor when fuel is supplied to said intake conduit through said outlet pipe for said reservoir.

5. The combination with an internal combustion engine having exhaust and intake conduits and a carburetor communicating with said intake conduit of an auxiliary fuel supply system comprising, a coil associated with said exhaust conduit for heating the fuel supply to gaseous form, means for supplying liquid fuel to said coil, a reservoir for gaseous fuel communicating with said coil, an outlet pipe for said reservoir communicating with said intake conduit, a throttle in said intake conduit, a valve in said outlet pipe, means connecting said throttle to said valve for regulating the admission of gaseous fuel to said intake conduit in proportion to the opening of said throttle and a branch of said exhaust conduit communicating with said intake conduit.

WILLARD LEDGER.
ROY BORDEN.